US009361449B2

(12) United States Patent
Sugano (10) Patent No.: US 9,361,449 B2
(45) Date of Patent: Jun. 7, 2016

(54) PLATFORM INTEGRITY VERIFICATION SYSTEM AND INFORMATION PROCESSING DEVICE

(75) Inventor: Yasuharu Sugano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 619 days.

(21) Appl. No.: 13/810,067

(22) PCT Filed: Jul. 27, 2011

(86) PCT No.: PCT/JP2011/067720
§ 371 (c)(1),
(2), (4) Date: Jan. 14, 2013

(87) PCT Pub. No.: WO2012/015064
PCT Pub. Date: Feb. 2, 2012

(65) Prior Publication Data
US 2013/0125244 A1    May 16, 2013

(30) Foreign Application Priority Data
Jul. 29, 2010   (JP) .................................. 2010-170473

(51) Int. Cl.
G06F 21/44    (2013.01)
G06F 21/57    (2013.01)

(52) U.S. Cl.
CPC ................ *G06F 21/44* (2013.01); *G06F 21/57* (2013.01)

(58) Field of Classification Search
CPC .................................. G06F 21/44; G06F 21/57
See application file for complete search history.

(56) References Cited

U.S. PATENT DOCUMENTS

| 7,739,738 B1* | 6/2010 | Sobel et al. ................... 726/24 |
| 7,774,391 B1* | 8/2010 | Le et al. ....................... 707/822 |
| 7,873,430 B1* | 1/2011 | Sprecher ....................... 700/100 |
| 2002/0091920 A1* | 7/2002 | Sasaki et al. ................ 713/100 |
| 2003/0074548 A1* | 4/2003 | Cromer ................ G06F 21/575 713/1 |
| 2005/0132206 A1* | 6/2005 | Palliyil et al. ............... 713/188 |

(Continued)

FOREIGN PATENT DOCUMENTS

| JP | 2005-301550 A | 10/2005 |
| JP | 2009-129061 A | 6/2009 |
| WO | 2010/021269 A1 | 2/2010 |

OTHER PUBLICATIONS

ISR issued Sep. 6, 2011 for parent PCT/JP2011/067720.

*Primary Examiner* — William Goodchild
(74) *Attorney, Agent, or Firm* — Rossi, Kimms & McDowell LLP (57) ABSTRACT

A platform integrity verification system capable of executing platform integrity verification by a trusted boot without causing a delay of system startup time. The platform integrity verification system has an information processing device and an integrity verification computer that is communicably connected to each other. The information processing device comprises an acquisition section acquires a unique value from each of a plurality of programs executed by the information processing device when the information processing device is shut down; and a storage section configured to store the unique value acquired by the acquisition section in a storage device. The integrity verification computer comprises a comparison section configured to acquire the unique value stored in the storage device through communication with the information processing device and compares the acquired unique value with a predetermined value held in advance for each program.

9 Claims, 5 Drawing Sheets (56) References Cited

U.S. PATENT DOCUMENTS

| | | | |
|---|---|---|---|
| 2006/0031673 A1* | 2/2006 | Beck et al. | 713/164 |
| 2007/0124818 A1* | 5/2007 | Bumiller et al. | 726/26 |
| 2008/0126779 A1* | 5/2008 | Smith | G06F 21/575 713/2 |
| 2009/0132829 A1 | 5/2009 | Ohhashi | |

* cited by examiner

| MEASUREMENT TARGET | MEASUREMENT DATE | MEASUREMENT VALUE | CORRECT VALUE | INTEGRITY VERIFICATION RESULT |
|---|---|---|---|---|
| BIOS | 2009/01/01 0:00 | adfjia2ksidde | adfjia2ksidde | OK |
| Boot Loader | 2009/01/01 0:00 | fsd65rwsgrgt4 | aaaaaaaaaaa | NG |
| OS | 2009/01/01 0:00 | ffegrrgrdgdgdff | ffegrrgrdgdgdff | OK |
| APL1.exe | 2009/01/01 0:00 | d3456fw3ssf3 | d3456fw3ssf3 | OK |
| ... | ... | ... | ... | ... |

FIG.5

PLATFORM INTEGRITY VERIFICATION SYSTEM AND INFORMATION PROCESSING DEVICE

TECHNICAL FIELD

The present invention relates to a platform integrity verification system and an information processing device, and more particularly, to a platform integrity verification system and an information processing device for checking that the components configuring a system platform are reliable without being tampered.

BACKGROUND ART

Recently, computers have become ubiquitous in society, and computer security measures are emphasized. For example, computer security measures include a method of ensuring the platform safety by preventing software fraud by a security chip having tamper resistance.

Techniques having enabled by this security chip having tamper resistance include a trusted boot. This trusted boot denotes a technique of verifying the integrity of platform components at device boot time, utilizing the fact that a security chip denotes hardware that does not allow software fraud. Utilizing this trusted boot technique makes it possible to find the platform tampering.

In this trusted boot, components loaded during a boot sequence are measured in order, and the measurement values are recorded in a register in a security chip. This operation starts using a non-rewritable area called "CRTM (Core Root of Trust for Measurement)" (which normally corresponds to a BIOS boot block) as the source of trust.

In this trusted boot, after measurement processing (acquisition processing), the measurement values recorded in the register in the security chip are compared with values expected as measurement values prepared in advance.

In this trusted boot, the above-noted processing makes it possible to verify the integrity of various source codes and essential libraries of a BIOS, boot loader, OS, application, and so on.

Conventionally, a trusted boot technique is suggested in which using a random value when recording a measurement value in a PCR (Platform Configuration Register) makes it difficult for attackers to acquire information for a platform attack (for example, refer to PTL 1).

PATENT LITERATURE

PTL 1: Japanese Laid-Open Patent Publication (Kokai) No. 2005-301550

SUMMARY OF INVENTION

Technical Problem

A measurement for integrity verification in a conventional trusted boot is executed at system startup time.

However, a device in which many applications are invoked at system startup time has such a problem that the system startup time is delayed if executing a measurement many times for integrity verification by the trusted boot.

Solution to Problem

The present invention provides a platform integrity verification system and an information processing device which is capable of executing platform integrity verification by a trusted boot without causing a delay of system startup time.

According to a first aspect of the present invention, there is provided a platform integrity verification system having an information processing device and an integrity verification computer that is communicably connected to each other, wherein the information processing device comprises: an acquisition unit configured to acquire a unique value from each of a plurality of programs executed by the information processing device when the information processing device is shut down; and a storage unit configured to store the unique value acquired by the acquisition unit in a storage device, and the integrity verification computer comprises a comparison unit configured to acquire the unique value stored in the storage device through communication with the information processing device and compares the acquired unique value with a predetermined value held in advance for each program.

According to a second aspect of the present invention, there is provided an information processing device that executes a plurality of programs, comprising: an acquisition unit configured to acquire a unique value from each of said plurality of programs when said information processing device is shut down; a storage unit configured to store the unique value acquired by said acquisition unit in a storage device; a determination unit configured to determine whether or not the unique value stored in said storage unit is correct, when said information processing device is started up; and a control unit configured to control said information processing device not to be started up if said determination unit determines that the unique value is not correct.

A platform integrity verification system or an information processing device of the present invention acquires a program-unique value when the device is shut down, which provides an advantage of making it possible to execute platform integrity verification without causing a delay of startup time.

Further features of the present invention will become apparent from the following description of an exemplary embodiment with reference to the attached drawings.

DESCRIPTIONS OF EMBODIMENTS

The platform integrity verification system according to the present invention will now be described in detail below with reference to the drawings showing preferred embodiments thereof.

Figure 1:
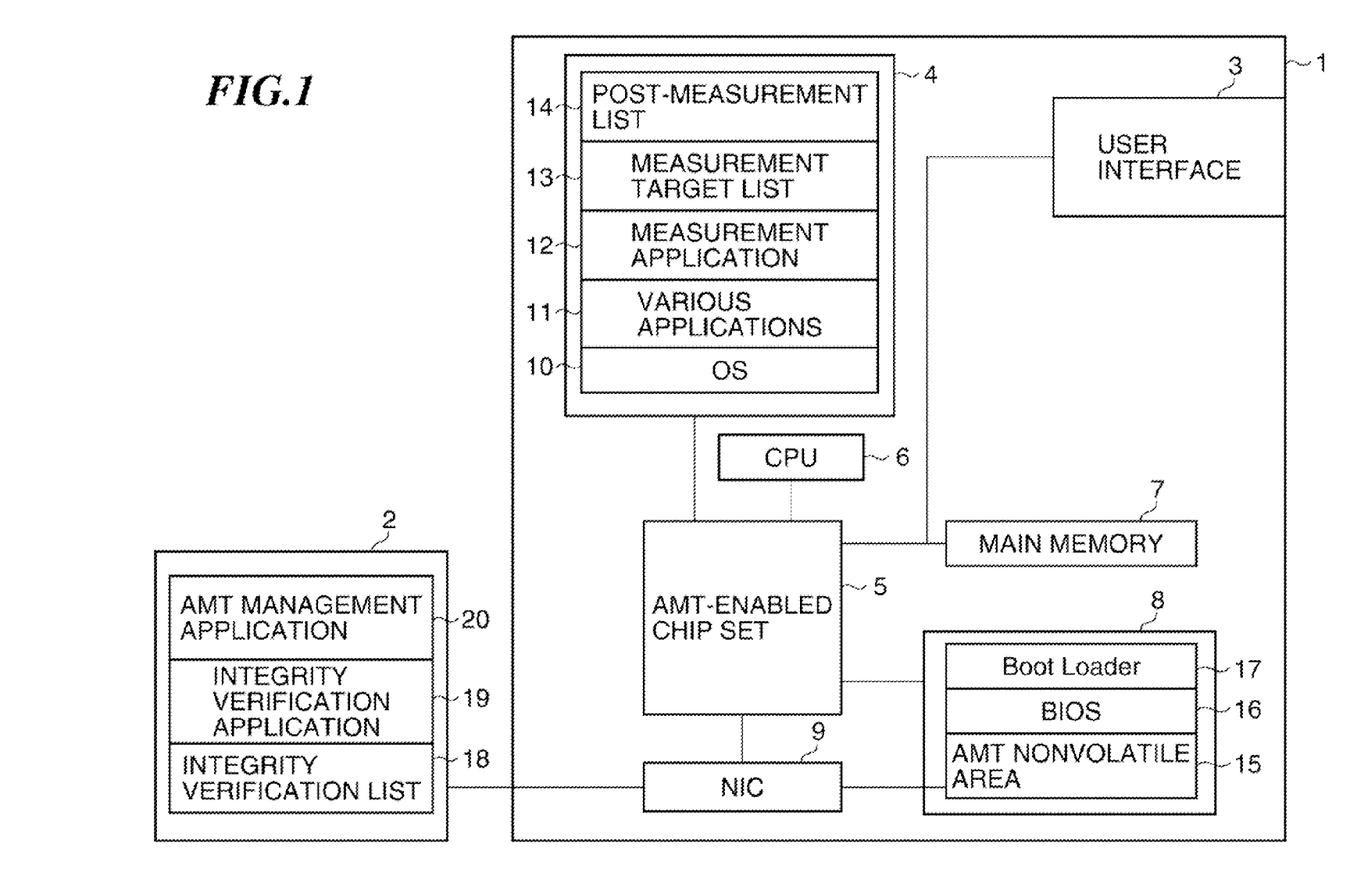
FIG. 1 is a view schematically showing a platform integrity verification system according to an embodiment of the present invention.

FIG. 1 is a view schematically showing a platform integrity verification system according to an embodiment of the present invention.

In FIG. 1, the platform integrity verification system according to an embodiment of the present invention is comprised of a platform measurement device 1, and an integrity verification computer 2 that is communicably connected to the platform measurement device 1 via a network.

This platform measurement device 1 is configured as a part of an information processing device. As this information processing device, for example, an image processing device such as a copier, and a personal computer are available. Also, the integrity verification computer 2 is comprised of, for example, a personal computer and so on. It should be noted that the platform measurement device 1 and the integrity verification computer 2 may be connected to each other via an interface (such as a USB) other than networks.

Each of the platform measurement device 1 and integrity verification computer 2 can be configured by an MFP (Multi Function Printer), a PC (Personal Computer), and so on. It should be noted that the platform integrity verification system of the present invention is not limited to these devices.

This platform measurement device 1 is comprised of hardware such as a user interface 3, a hard disk 4, an AMT-enabled chip set 5, a CPU 6 that controls the whole device, a main memory 7, a flash memory 8 and an NIC 9. It should be noted that the NIC 9 denotes a Network Interface Card.

For example, at the last timing of the device shutdown sequence, this platform measurement device 1 finds measurement values acquired by calculating unique non-overlapping values with respect to platform components. Further, this platform measurement device 1 records each measurement value calculated as above in a nonvolatile area. The platform measurement device 1 has a function of measuring a measurement target and then recording the result in a post-measurement list (post-acquisition list) and a function of determining, from this post-measurement list (post-acquisition list), whether or not the current measurement target has been already measured.

The platform measurement device 1, configured as a measurement section that operates as above, is connected to the integrity verification computer 2 via a network. This integrity verification computer 2 is comprised of an AMT management application 20, an integrity measurement application 19, and an integrity verification list 18. Here, the AMT management application 20 and the integrity measurement application 19 are comprised of software. The integrity verification list 18 is comprised of data.

It should be noted that AMT (Active Management Technology) is the name of a security function developed by Intel Corporation (registered trademark) and is realized by an AMT-enabled chip set.

Using a dedicated AMT management application makes it possible to acquire information stored in a nonvolatile area on a computer equipped with an AMT function via a network from an external computer. This information acquisition operation is available regardless of the power supply state of the computer equipped with the AMT function. This dedicated AMT management application forms a nonvolatile area measurement value acquisition section that acquires a measurement value stored in the nonvolatile area via the network. This nonvolatile area measurement value acquisition section is configured such that the integrity verification computer 2 can acquire a measurement value stored in a nonvolatile measurement value storage area via a communication path, of which security is ensured.

The hard disk 4 of the platform measurement device 1 stores an OS 10, various applications 11, a measurement application 12, a measurement target list 13 (acquisition target list), a post-measurement list 14 (post-acquisition list) and so on.

Here, the OS 10, the various applications 11 and the measurement application 12 are comprised of software. The measurement target list 13 (acquisition target list) and the post-measurement list 14 (post-acquisition list) are comprised of data.

The flash memory 8 provided in the platform measurement device 1 stores an AMT nonvolatile area 15, a BIOS 16, a boot loader 17 and so on. Here, the AMT nonvolatile area 15 is comprised of hardware and configured as a nonvolatile measurement value storage area. The BIOS 16 and the boot loader 17 are comprised of software.

The user interface 3 provided in this platform measurement device 1 is comprised of a touch panel and so on, and displays a screen that accepts, from the user, a request for the power supply on/off of the device or other requests such as a request for using services provided by the device.

Also, the integrity verification computer 2 stores the integrity verification list 18 in advance. This integrity verification list 18 denotes a list of formal measurement results for the BIOS 16, the boot loader 17, the OS 10, the various applications 11 and so on which are the measurement targets in the platform measurement device 1.

This integrity verification computer 2 verifies the integrity of the various applications 11 (which are collectively referred to as "the programs") designated by the BIOS 16, the boot loader 17, the OS 10, and the measurement target list 13. That is, it is verified whether or not the programs are each tampered. Also, in the present embodiment, the term "measurement" shall denote calculating a hash value of a measurement target by a predetermined hash function such as SHA-1.

Figure 2:
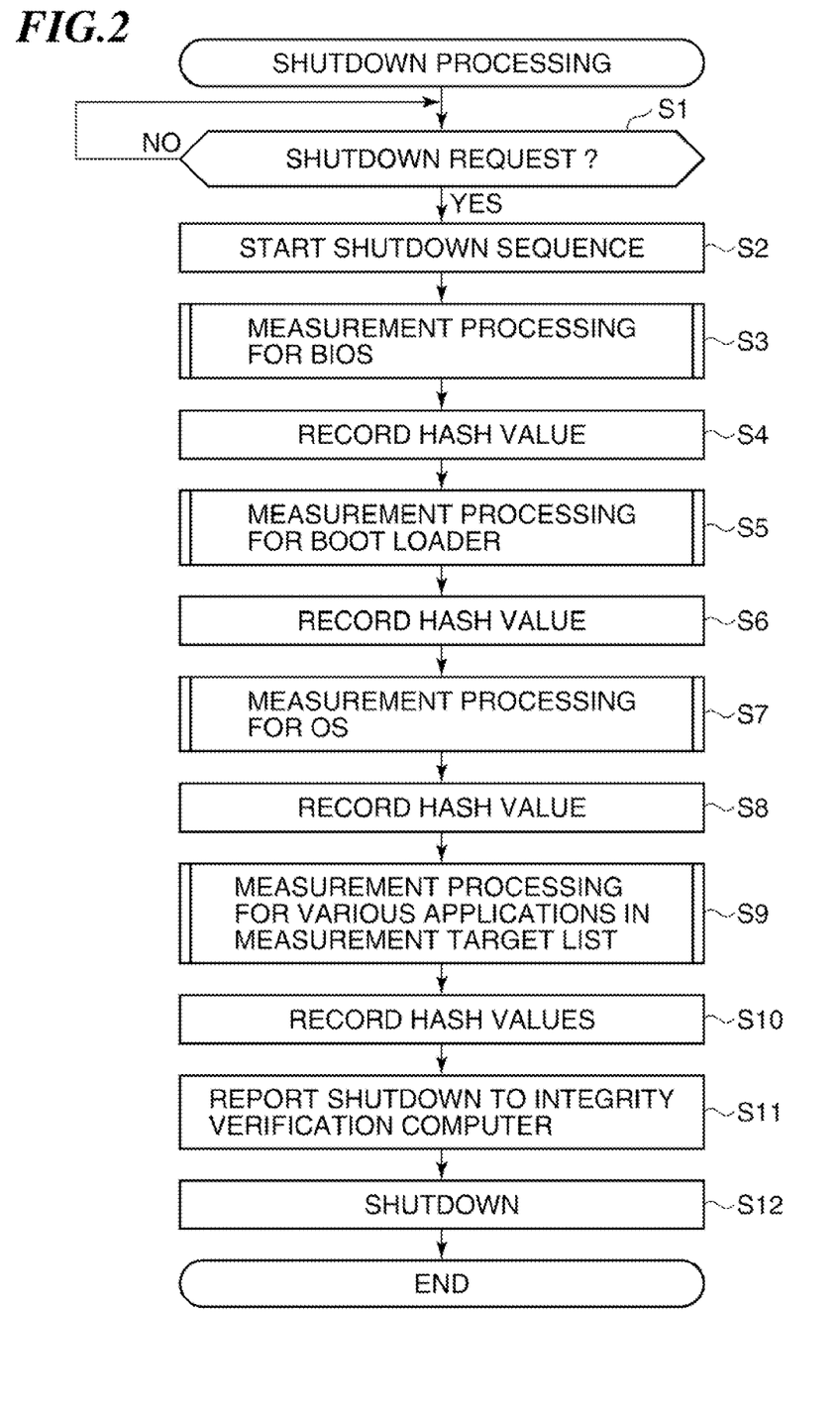
FIG. 2 is a flowchart showing the procedure of shutdown processing executed by the platform measurement device of FIG. 1.

FIG. 2 is a flowchart showing the procedure of shutdown processing executed by the platform measurement device of FIG. 1.

The processing in FIG. 2 waits until a shutdown request for the platform measurement device 1 is issued from the user interface 3 by the user (NO to step S1).

Then, if the shutdown request is issued by the user (YES to the step S1), a normal shutdown sequence is started using the measurement application 12 (step S2).

This normal shutdown sequence is executed by a power supply management application included in the various applications 11 until immediately before the shutdown is executed.

Here, the normal shutdown sequence denotes a series of processing required for the platform measurement device 1 to shut down itself.

Also, the shutdown request may be issued by the user using not only a local user interface but also a remote user interface. Here, the local user interface denotes a user interface incorporated in the platform measurement device 1, and also the remote user interface denotes an interface that is provided by dedicated software and so on, while enabling the platform measurement device 1 to be operated from an external PC and so on via a network.

Next, at the last timing of the shutdown sequence, the measurement processing in FIG. 5 described later is executed for the BIOS 16 (step S3) (acquisition processing) and a hash value acquired therein is recorded in the AMT nonvolatile area 15 (step S4). Here, the last timing of the shutdown sequence denotes a state in which, for example, processing required to shut down the platform measurement device 1 is completed to allow its power supply to be turned off.

Then, the measurement processing in FIG. 5 described later is executed for the boot loader 17 (step S5) (acquisition processing) and a hash value acquired therein is recorded in the AMT nonvolatile area 15 (step S6).

Similarly as above, the measurement processing in FIG. 5 described later is executed for the OS 10 (step S7) (acquisition processing) and a hash value acquired therein is recorded in the AMT nonvolatile area 15 (step S8).

Similarly as above, the measurement processing in FIG. 5 described later is sequentially executed for the various applications 11 described in the measurement target list 13 stored in the hard disk 4 (step S9) (acquisition processing).

The hash values acquired in the step S9 are recorded in the AMT nonvolatile area 15 in turn (step S10). Thus, measurement and record processing for all measurement targets described in the measurement target list 13 is finished by the measurement application 12.

Next, after finishing this measurement and record processing has been finished, the platform measurement device 1 reports to the integrity verification computer 2 that the platform measurement device 1 executes the shutdown thereof (step S11) (shutdown report section) to shut down the platform measurement device 1 (step S12), followed by terminating the process.

Thus, the platform measurement device 1 executes the measurement processing during the shutdown processing, thereby eliminating the need for executing the measurement processing when starting up the device, which enables the measurement processing to be executed without affecting the startup time of the platform measurement device 1.

After having received the shutdown report from the platform measurement device 1, the integrity verification computer 2 accesses the nonvolatile measurement value storage area at a predetermined time or after a lapse of a predetermined time period to execute integrity verification processing.

Figure 3:
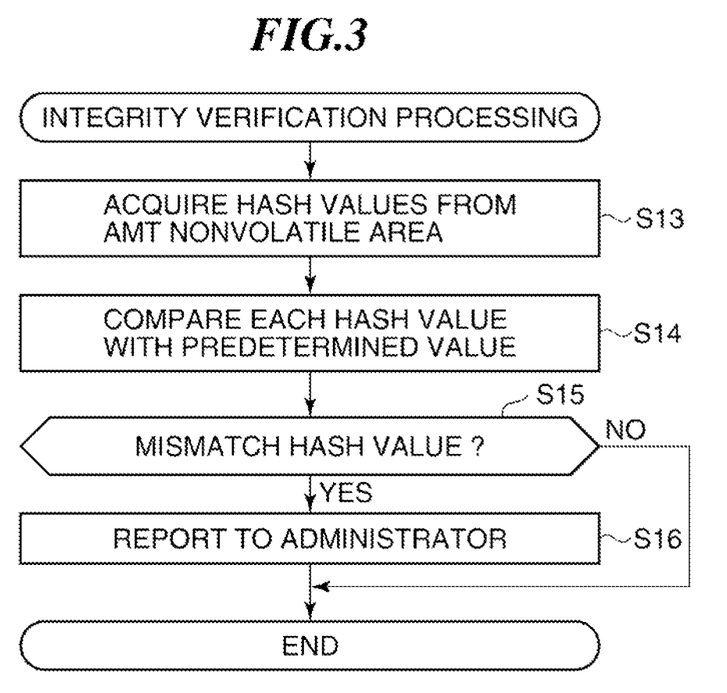
FIG. 3 is a flowchart showing the procedure of integrity verification processing executed by the platform measurement device of FIG. 1.

FIG. 3 is a flowchart showing the procedure of integrity verification processing executed by the platform measurement device of FIG. 1.

The processing in FIG. 3 is to verify the integrity of the platform measurement device 1 by the integrity verification computer 2 externally connected to the platform measurement device 1 via a network, and this processing is executed by the CPU 6 using the integrity measurement application 19 (measurement value external comparison section).

After having received the shutdown report from the platform measurement device 1, the integrity verification computer 2 starts integrity verification processing at a predetermined time or after a lapse of predetermined time period. Further, the integrity verification computer 2 acquires the recorded hash values from the AMT nonvolatile area 15 in the platform measurement device 1 having already shut down, via the NIC 9 (step S13). It should be noted that these recorded hash values are recorded in the steps S4, S6, S8 and S10 of FIG. 2.

Next, the integrity verification list 18 stored in advance and the acquired hash values are sequentially compared to verify the integrity (step S14). The integrity verification list 18 stores in advance the correct hash values of the BIOS 16, the boot loader 17, the OS 10, and the various applications 11 of the platform measurement device 1. If the hash values stored in the integrity verification list 18 and the hash values measured in the processing of FIG. 2 are matched, it follows that the program codes are not tampered, whereas if they are not matched, it follows that the program codes are tampered or corrupted. That is, the integrity measurement application 19 configures a measurement value external comparison section that compares measurement values of platform components and predetermined measurement values held in advance in the integrity verification computer for every component basis.

As a result of the comparison in the step S14, if there is a measurement target program having a mismatch hash value (YES to step S15), the measurement target program having the mismatch hash value is reported as mismatch information to an administrator by a predetermined method such as e-mail set in advance by the integrity verification computer (step S16), followed by terminating the process.

Figure 4:
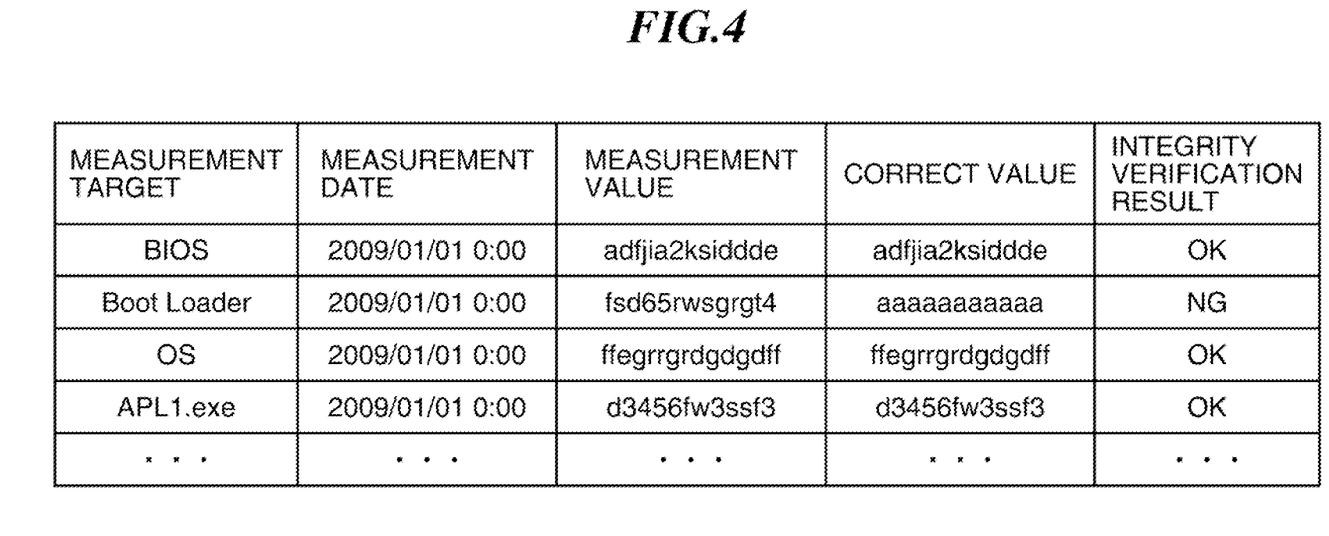
FIG. 4 is a view which is useful in explaining a log of the result of measurement executed by the platform measurement device of FIG. 1.

It should be noted that a log may be stored in the integrity verification computer 2 instead of reporting to a computer of the administrator and so on, or the report to the administrator and a record as the log may be both executed. One example of this log is shown in FIG. 4. The correct value in this FIG. 4 denotes a hash value expected for each measurement target stored in the integrity verification list.

Also, the integrity measurement application 19 may be configured to have a function of reporting comparison results of measurement values for integrity verification to a predetermined computer of the administrator and so on.

Further, if a report destination computer is not set, the integrity measurement application 19 may be configured to encourage a user to set the report destination computer when starting up the system.

As a result of the comparison in the step S15, if there is a measurement target program having a mismatch hash value (YES to the step S15), it may be written in the AMT nonvolatile area 15 that there is a measurement target program having a mismatch hash value. In the next startup, if the platform measurement device 1 refers to the AMT nonvolatile area 15 at first and finds that there is a written measurement target program having a mismatch hash value, the startup may be stopped, which makes it possible to prevent the startup of the device having a tampered program.

Also, the processing in FIG. 3 may be executed by the platform measurement device 1. In this case, the platform measurement device 1 stores the correct hash value of each program in advance. The hush values may be preferably stored so as not to be tampered, for example, may be stored in a ROM (not shown) or held in the AMT-enabled chip set 5. At the startup time of the platform measurement device 1, the hash values stored in the AMT nonvolatile area 15 and the correct hash values stored in advance are compared, and if they are matched, the startup of the platform measurement device 1 is allowed, whereas if there is a mismatch hash value, the platform measurement device 1 is controlled not to be started up, which makes it possible to verify the integrity of the programs without providing the integrity verification computer 2.

In the steps S3, S5, S7, and S9 in FIG. 2 described above, the measurement by the measurement application 12 may be targeted for not only executable files of measurement targets but also a library used by the executable files. For example, when there are measurement targets of APL1.exe and APL2.exe and they use a library of common_lib.a, this common_lib.a is measured twice.

Also, the measurement order is, for example, from APL1.exe, common_lib.a, APL2.exe to common_lib.a. In this case, even when the library is a measurement target, if its measurement is executed once, its next measurement may be skipped, which makes it possible to improve performance related to measurement.

As a result of the comparison in the step S14, if all the measurement target hash values of the measurement target programs are matched with the correct ones, respectively (NO to the step S15), the process is immediately terminated.

Figure 5:
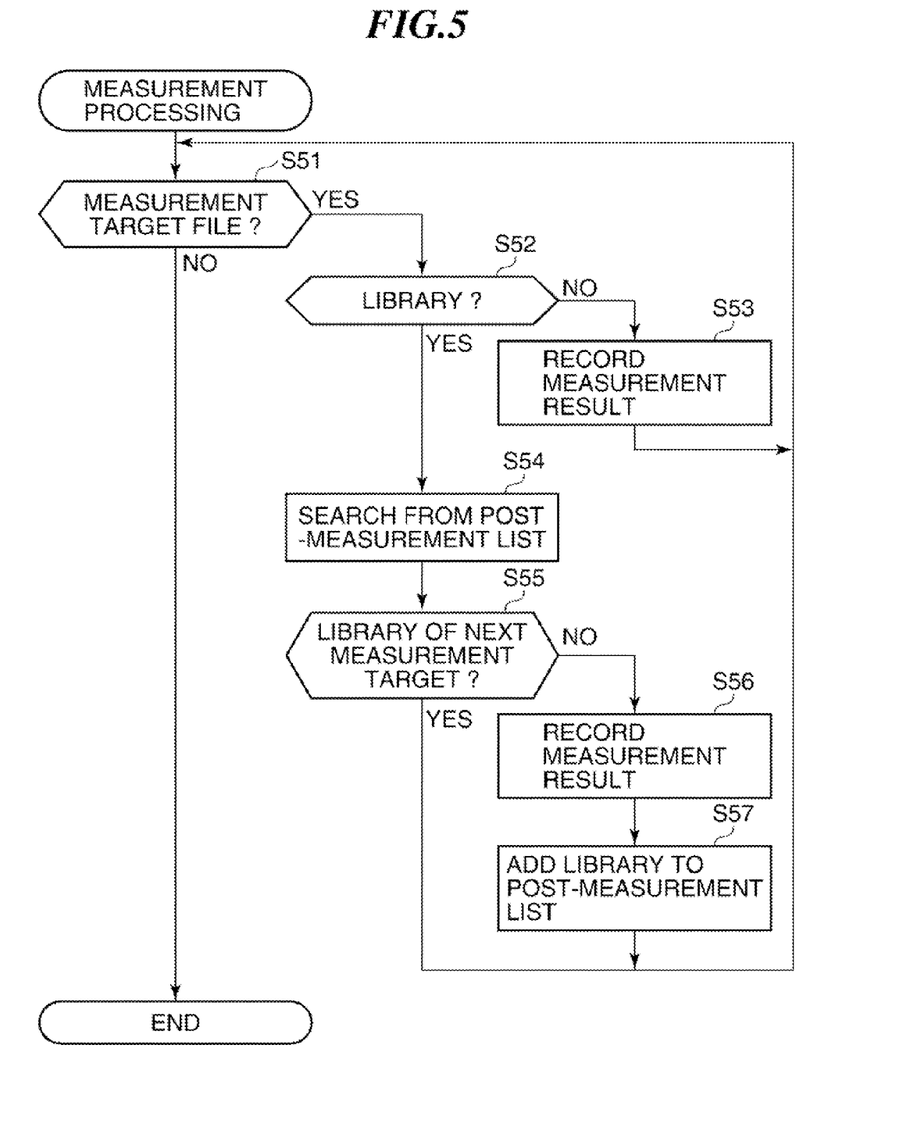
FIG. 5 is a flowchart showing the procedure of measurement processing executed in steps S3, S5, S7 and S9 of FIG. 2.

FIG. 5 is a flowchart showing the procesure of measurement processing executed in the steps S3, S5, S7 and S9 of FIG. 2.

The processing in FIG. 5 is executed by the CPU 6 using the measurement application 12.

In FIG. 5, first, it is determined whether or not there is a measurement target file (program) (step S51), and if there is a measurement target file (YES to the step S51), it is determined whether or not the measurement target is a library (step S52).

As a result of the determination of the step S52, if the measurement target is not a library, that is, if the measurement target is an executable file, the executable file is measured and the result is recorded in the AMT nonviolatile area 15 (step S53), followed by repeating the processes of the step S51 and subsequent steps.

As a result of the determination of the step S52, if the measurement target is a library, the measurement target library of the target is searched from the post-measurement list 14 (step S54), and moreover, it is determined whether or not there is the next measurement target library in the post-measurement list 14 (step S55).

As a result of the determination of the step S54, if there is no library of the next measurement target library in the post-measurement list 14, the measurement target library is measured and the measured result is recorded in the AMT nonvolatile area 15 (step S56). Next, the measured library is added to the post-measurement list 14 (step S57), followed by repeating the processes of the step S51 and subsequent steps.

Also, as a result of the determination of the step S55, if there is a library of the current measurement target in the post-measurement list 14, the processes of the step S51 and subsequent steps are repeated.

As a result of the determination of the step S51, if there is no next measurement target file, the process is immediately terminated.

The measurement application 12 executes a measurement according to the procedure of this measurement processing, to thereby improve the performance related to the platform integrity verification.

Also, even in a trusted boot using a normal TPM, by following the above-described procedures makes it possible to improve the performance related to the startup time of the device.

As described above, according to the present embodiment, the measurement is executed for verifying the integrity of the programs in the device when shutting down the device, thereby eliminating the need for executing the measurement when starting up the device, which makes it possible to prevent the device startup time from increasing.

Also, in a case where measurement targets include a library, inhibiting the same library from being measured several times makes it possible to shorten the measurement time.

Also, the present invention is realized even by executing the following processing.

That is, software (program) that realizes the above-described embodiment functions is supplied to a system or a device via a network or various storage media.

The system or device computer (or CPU, MPU and so on) reads out the program and executes processing. In this case, the program and a storage medium storing this program configure the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST 1 platform measurement device
2 integrity verification computer
6 CPU

The invention claimed is:

1. A platform integrity verification system having an information processing device and an integrity verification computer that are is communicably connected to each other, wherein
said information processing device comprises:
an acquisition unit configured to perform acquisition processing including acquiring a plurality of unique values from a plurality of programs executed by said information processing device when said information processing device is shut down, each respective unique value of the plurality of unique values acquired from a respective program of the plurality of programs, wherein said information processing device is configured, after said acquisition unit finishes the acquisition processing, to report to said integrity verification computer that said information processing device is shut down; and
a storage unit configured to store the plurality of unique values acquired by said acquisition unit in a storage device, and
said integrity verification computer comprises a comparison unit configured to retrieve each respective unique value of the plurality of unique values stored in the storage device through communication with said information processing device and to compare the respective unique value with a respective predetermined value held in advance for the respective program from which the respective unique value was acquired by the acquisition unit.

2. The platform integrity verification system according to claim 1, wherein said comparison unit is configured to enable said integrity verification computer to acquire a measurement value recorded in the storage device via a communication path, of which security is ensured.

3. The platform integrity verification system according to claim 1, wherein said information processing device includes an acquisition target list, having recorded in advance, at least one program of an acquisition target for said acquisition unit, and said acquisition unit is configured to acquire a unique value for the one program recorded in the acquisition target list.

4. The platform integrity verification system according to claim 1, wherein said integrity verification computer comprises a report unit configured to report a comparison result of said comparison unit to a predetermined computer.

5. The platform integrity verification system according to claim 1, wherein said integrity verification computer is adapted to access the plurality of unique values stored in the storage device after having received a shutdown report from said information processing device, even in a state where said information processing device is shut down.

6. The platform integrity verification system according to claim 5, wherein if a value retrieved from the storage device and a value held in advance in said integrity verification computer are not matched as a result of the comparison in said comparison unit, said integrity verification computer is configured to write mismatch information showing the mismatch information in said storage device, and when the storage device stores the mismatch information, said information processing device is configured to not start up said information processing device.

7. The platform integrity verification system according to claim 1, wherein said acquisition unit is configured to record a program, of which a respective unique value of the plurality of unique values is acquired, in a post-acquisition list, and to acquire, with reference to said post-acquisition list, a respective unique value of the plurality of unique values from a program, of which a unique value was not acquired.

8. The platform integrity verification system according to claim 1, wherein said acquisition unit is configured to acquire a hash value of a program of the plurality of programs.

9. An information processing device that executes a plurality of programs, comprising:
   an acquisition unit configured to perform acquisition processing including acquiring a plurality of unique values from said plurality of programs when said information processing device is shut down, each respective unique value of the plurality of unique values acquired from a respective program of the plurality of programs, wherein, after said acquisition unit finishes the acquisition processing, said information processing device is configured to report to an integrity verification computer that said information processing device is shut down;
   a storage unit configured to store the plurality of unique values acquired by said acquisition unit in a storage device;
   a determination unit configured to determine whether or not each respective unique value of the plurality of unique values stored in said storage device is correct, when said information processing device is started up; and
   a control unit configured to control said information processing device not to be started up if said determination unit determines that at least one unique value of the plurality of unique values is not correct.

* * * * *